United States Patent [19]

Fluck

[11] Patent Number: 4,457,665

[45] Date of Patent: Jul. 3, 1984

[54] METHOD FOR REMOVING INDIVIDUAL ARTICLES FROM A STACK

[75] Inventor: René Fluck, Schleitheim, Switzerland

[73] Assignee: Sig Schweizerische Industrie-Gesellschaft, Neuhausen am Rheinfall, Switzerland

[21] Appl. No.: 377,049

[22] Filed: May 11, 1982

[30] Foreign Application Priority Data

May 12, 1981 [CH] Switzerland .................. 3082/81

[51] Int. Cl.³ ............................................. B65G 59/06
[52] U.S. Cl. .................................. 414/786; 414/126; 414/131; 221/262
[58] Field of Search ............... 414/113, 125, 126, 131, 414/786; 221/262, 251

[56] References Cited

U.S. PATENT DOCUMENTS

| 1,330,639 | 2/1920 | Leumann | 221/251 |
| 2,770,392 | 11/1956 | Roberts | 221/251 |
| 3,298,568 | 1/1967 | Brocq | 221/262 |
| 4,013,179 | 3/1977 | Fluck | 414/126 X |

FOREIGN PATENT DOCUMENTS

| 1045892 | 3/1960 | Fed. Rep. of Germany. |
| 211232 | 9/1960 | Fed. Rep. of Germany ...... 414/131 |
| 2539776 | 4/1976 | Fed. Rep. of Germany. |
| 739478 | 10/1955 | United Kingdom. |

Primary Examiner—Robert J. Spar
Assistant Examiner—Ken Muncy
Attorney, Agent, or Firm—Spencer & Frank

[57] ABSTRACT

A method for removing at least one flat article at a time from an at least approximately vertical stack of articles supported on a support surface, by the steps of pushing at least the lowermost article in the stack sideways away from the stack by moving an ejector member transversely to the stack, and approximately simultaneously with the contact of the ejector member at the lowermost article, lowing the support surface in such a manner that the ejector member ejects the lowermost article from the stack during free fall of the lowermost article.

6 Claims, 9 Drawing Figures

METHOD FOR REMOVING INDIVIDUAL ARTICLES FROM A STACK

BACKGROUND OF THE INVENTION

The present invention relates to a method for removing at least one flat article at a time from the bottom of a verticle stack.

When packaging stackable, flat articles, particularly very fragile or otherwise easily destroyed articles, such as cookies, crackers, sandwiches or the like, the articles are often collected in vertical stacks or horizontal rows. Since the assembly of these stacks or rows occurs irregularly over the entire width of the conveying line, this arrangement can be used to form an intermediate store from which at the end of these stacks or rows a certain number of articles can be removed in a periodic manner and formed into a packable stack which always contains the same number of articles.

The removal of the articles from the stacks or rows is difficult, due to their fragile nature and, accordingly, various devices have become developed for removing such articles from stacks or rows without damage.

German Pat. No. 1,045,892 discloses an apparatus for forming packagable stacks of the above-listed type of articles. The articles are here collected, for example, in three stacks. By means of a chain converyor equipped with grippers, the lower-most article in each group is pushed away and, after having slid over a suitable slide into compartments, is stacked between two guides. The guides support the rest of the stack while the lowermost article is pushed away, i.e. the pressure of the stack on the supporting surface of the guides must not exceed a certain level because otherwise the danger of breakage becomes too great. Therefore, the articles must rest on top of one another only throughout part of the stack. The curve in the stack required for this purpose, however, may have several inherent drawbacks.

In order to make the pressure on the lowermost article independent of the height of the stack, it has been proposed to periodically hold or release at least a group of the lower-most articles by means of a clamping device to thus maintain the friction due to pressure at always the same level during removal of the lowermost article. Such an arrangement is disclosed, for example in German Auslegeschrift [published patent application] No. 2,539,776. One wall of a shaft is made movable back and forth to periodically support and release the stack. To reduce the danger of breakage, the walls of the shaft are provided with an elastic coating.

Although with such a clamping wall it is possible to equalize tolerance-caused deviations in the dimensions of the articles, this movable shaft wall presents a time disadvantage in that a certain path has to first be traversed before the articles are released by the elastic coating. Moreover, multilayer articles could be transported vertically downwardly only if the outermost layers were connected together and not just resting loosely on one another, as this is the case, for example, with sandwiches.

SUMMARY OF THE INVENTION

It is therefore an object of the present invention to overcome these drawbacks and to simultaneously reduce abrasion and damage to a minimum and to neatly remove from the stack even loosely stacked articles.

The above and other objects are achieved, according to the invention, by a method for removing at least one flat article at a time from an at least approximately vertical stack of articles supported on a support surface, which method is carried out by pushing at least the lowermost article in the stack sideways away from the stack by moving an ejector member transverely to the stack, and approximately simultaneously with the contact of the ejector member at the lowermost article, lowering the support surface in such a manner that the ejector member ejects the lowermost article from the stack during free fall of the lowermost article.

An examplary apparatus for implementing the method according to the invention will be described below.

DESCRIPTION OF THE PREFERRED EMBODIMENTS

Figure 1:
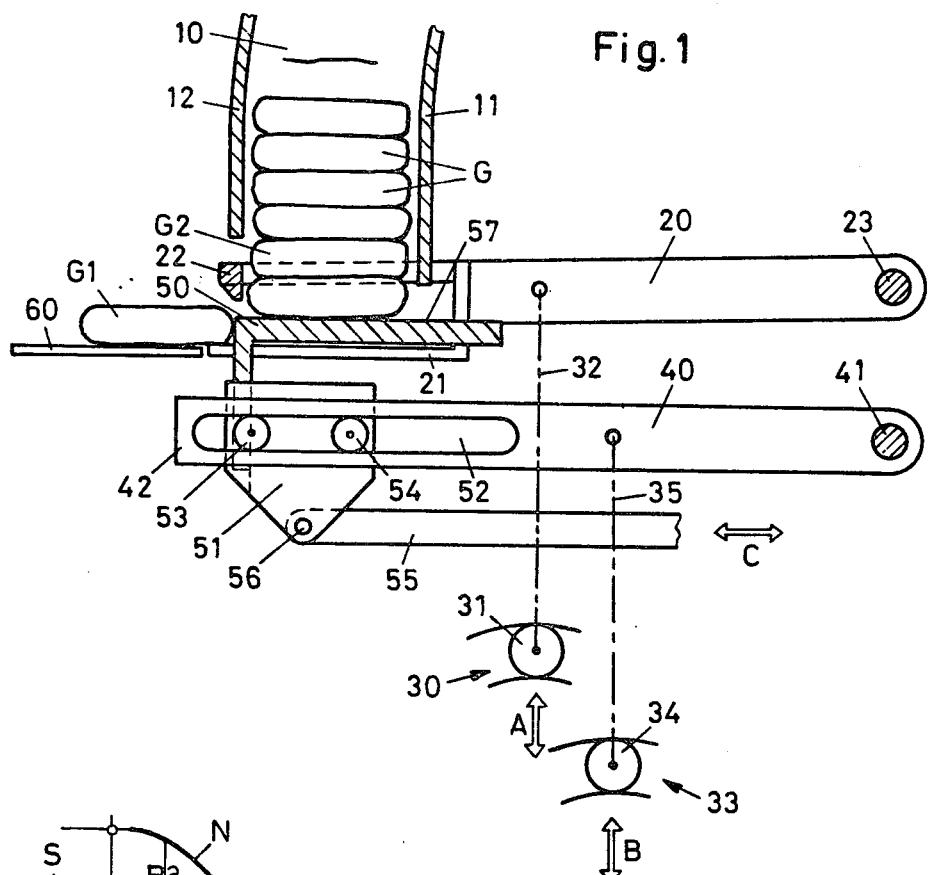
FIG. 1 is a schematic elevational view of a feed shaft equipped with an ejector as the discharge member and including drive means for the ejector and stack support, operating according to the invention.

As shown in FIG. 1, a number of articles G are disposed in a shaft 10 which is closed on all sides, only two walls 11 and 12 being shown in section. A bottom 21 serving as the stack support and an abutment 22 are rigidly fastened to a lever arm 20. Via a first cam disc 30 which is only indicated, and a sensor roller 31 attached to a rod assembly 32, likewise only indicated, the lever arm 20 is caused to move pivotally in the direction of the double arrow A. The other end of the lever arm 20 is pivotally mounted on a bearing shaft 23 fixed to the machine frame.

A second lever arm 40 which is likewise pivotally mounted on a bearing shaft 41 fixed to the machine frame, serves as the guide lever for the ejector 50. A second indicated cam disc 33 with sensor roller 34 and rod assembly 35 serves to impart an up and down pivotal movement in the direction of the double arrow B to the above-mentioned second lever arm 40. In the region of its free end 42, the lever arm 40 is constructed to provide a guide rail for a carriage 51. The guide rail is defined by a slit recess 52 in which two rollers 53, 54 of the carriage 51 are rotatably mounted. A push rod 55 is mounted at the carriage 51 in an articulated manner by means of a bearing pin 56. An eccentric mechanism (not shown) moves the push rod in the direction of the double arrow C. The ejector 50 is rigidly connected with the carriage 51.

Flush with the upper side of the bottom 21 when it is in its lowest position, there is disposed a receiving bottom 60. This may be a conveyor belt or the support of a stack former which is lowered with every article placed thereon.

The cam discs 30 and 33 with their sensor rollers 31 and 34, respectively, and associated rods 32 and 35, respectively, as well as the eccentric mechanism for the drive of the carriage 51 and a suitable drive for the receiving bottom 60 are elements known in the packaging art and need not be described further at this point in order to keep the description concise.

Figure 2:
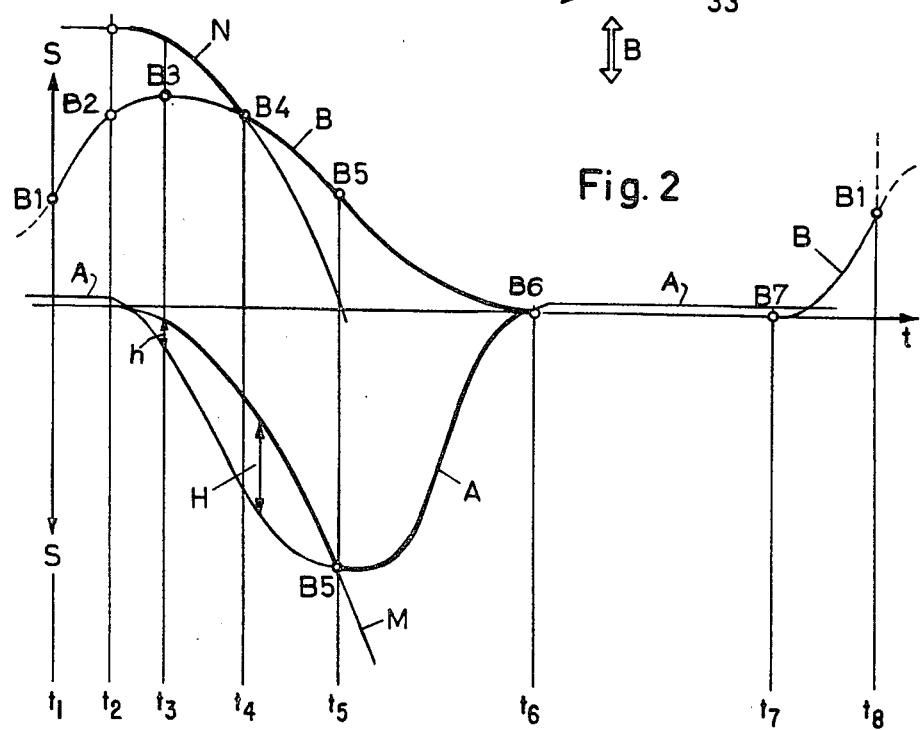
FIG. 2 is a time-path diagram to show the various paths traveled by stack support, stack, ejector and article in the apparatus of FIG. 1.
Figure 3:
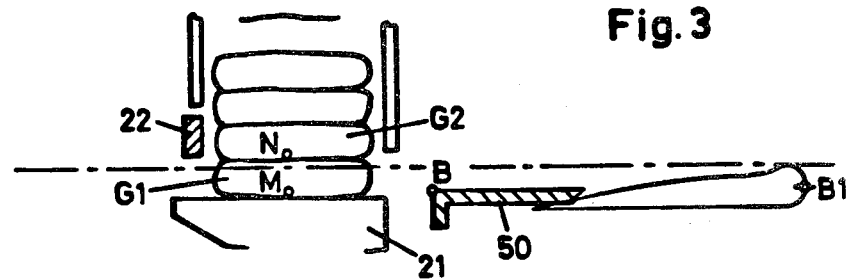
FIGS. 3 through 8 show successive phases in the ejection of an article and the associated phase positions in the path of movement of the ejector.
Figure 4:
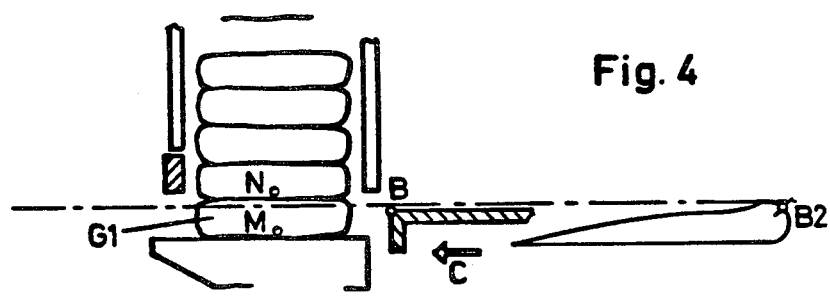
Figure 5:
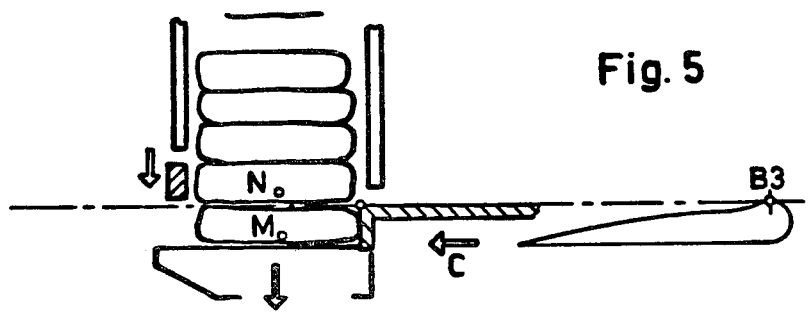
Figure 6:
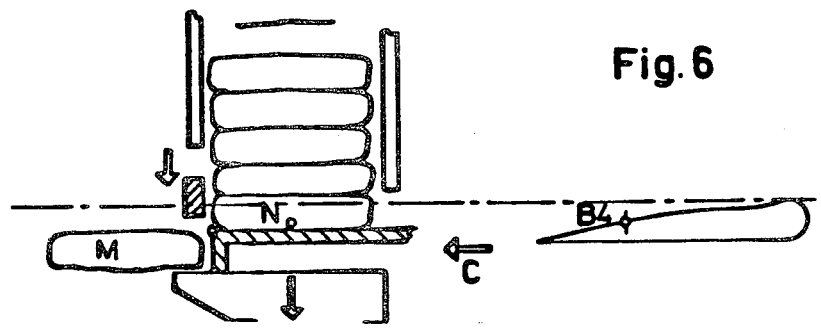
Figure 7:
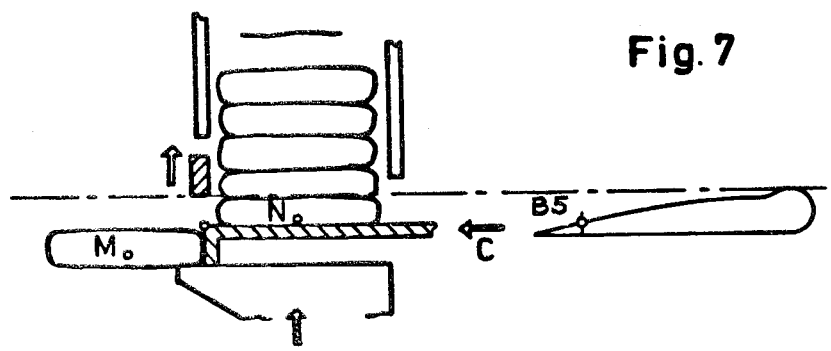
Figure 8:
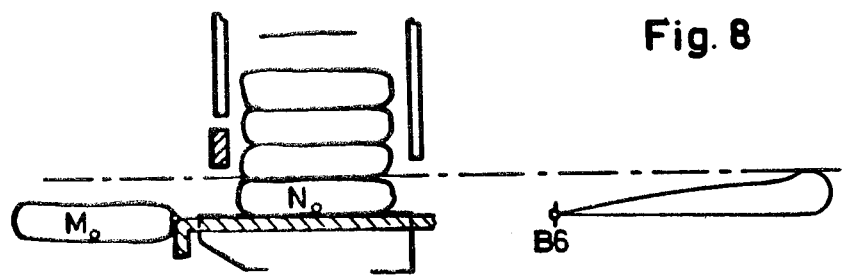
Figure 9:
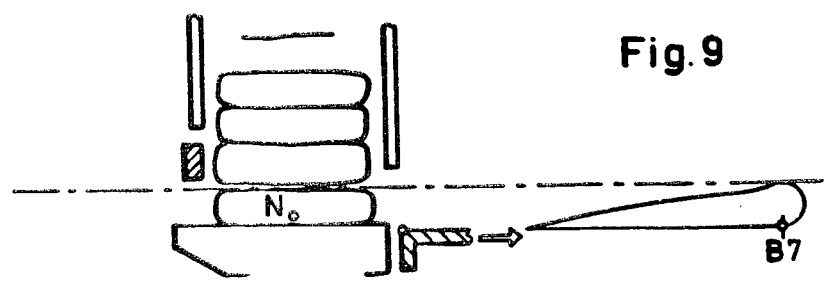
FIG. 9 shows a subsequent operating position near the end of the return movement of the ejector.

The operation of this arrangement will be described now with reference to FIGS. 2 through 9. The time-path diagram of FIG. 2 shows the curves identified with the same letters as the corresponding movement direction arrows of FIG. 1. Thus curve A illustrates the movement of the bottom 21 and curve B the vertical movement of the ejector 50, in unison with lever arm 40. Further, curve M represents the free fall behavior of a point M, shown in FIGS. 2-7, at the underside of an ejected article G1 and curve N represents the free fall behavior of a point N, shown in FIGS. 2-9, at the underside of the lowermost article in the stack, i.e. the article immediately above the ejected article. Both curves M and N have parabolic forms. Thus the point of intersection of the two curves B and N identifies the point in time at which the falling stack impacts on the horizontal contact face 57 of the ejector 50 and the point of intersection of curves A and M represents the point in time at which the stack is taken over by bottom 21.

The loop including points B1 to B7 at the right-hand side of each of the position FIGS. 3 to 9 shows the path or the respective position of point B at the upper left-hand corner of the ejector 50.

At time T1 (FIG. 3) the ejector 50 begins to advance toward the left while it simultaneously moves upwardly from an intermediate height. The bottom 21 is in its uppermost position.

At T2 (FIG. 4) the greatly accelerated lowering of the bottom 21 begins and thus the free fall of stack G together with the lowermost article G1.

At T3 (FIG. 5) the ejector 50 reaches its uppermost position, begins its downward movement and impinges on article G1 which it consequently pushes to the left. At this time, there already exists a small distance H between the bottom 21 and the article G1 so that the normal force and thus friction and abrasion between this article G1 and the next following article G2 become practically equal to zero during their relative horizontal displacement.

At T4 (FIG. 6) the underside of the falling stack lands on the ejector 50 which is being lowered less quickly than the stack.

At T5 (FIG. 7) the underside of the so far still free falling lowermost article impacts on the bottom 21 which now has also approximately reached its lowermost position and thereafter begins to move upwardly again.

At T6 (FIG. 8) the bottom 21 has again reached its upper end position and the ejector 50 begins its horizontal return to the right.

At T7 (FIG. 9) the upward movement of the ejector 50 begins.

At T8, ejector 50 and bottom 21 are again in the same position as at T1 (FIG. 3) and are ready to fallingly eject the next following article in the same manner.

It will be understood that the above description of the present invention is susceptible to various modifications, changes and adaptations, and the same are intended to be comprehended within the meaning and range of equivalents of the appended claims.

What is claimed is:

1. A method for removing at least one flat article at a time from an at least approximately vertical stack of articles supported on a support surface, comprising: pushing at least the lowermost article in the stack sideways away from the stack by moving an ejector member transversely to the stack; and approximately simultaneously with the contact of the ejector member at the lowermost article, lowering the support surface in such a manner that the ejector member ejects the lowermost article from the stack during free fall of the lowermost article wherein said step of lowering comprises lowering the support surface at a speed greater than the free fall velocity of the stack at least prior to the initial contact between the ejector member and the lowermost article, and the steps of pushing and lowering are carried out in a manner to cause the lowermost article to undergo free fall at least until the lowermost article has been pushed entirely away from beneath the next article in the stack above the lowermost article.

2. Method as defined in claim 1 further comprising moving an abutment for at least the next article in the stack above the article pushed sideways from the stack in synchronism with the support surface.

3. Method as defined in claim 1 or 2 further comprising subjecting the ejector member to an up and down movement simultaneously with its movement transversely to the stack to follow at least approximately the descent of the falling lowermost article.

4. Method as defined in claim 1 wherein the ejector member is driven by two separate drive means and is composed of an ejector which is fastened to a push rod driven by one of the separate drive means.

5. Method as defined in claim 4 wherein the support surface is rigidly connected to an abutment for at least the next article in the stack above the article pushed sideways from the stack.

6. Method as defined in claim 1 carried out during the formation of packagable stacks composed of a plurality of independently assembled stacks of articles, such as cookies, crackers, sandwiches or the like.

* * * * *